No. 612,968. Patented Oct. 25, 1898.
M. H. HANSEN.
SPRING SCALE.
(Application filed Dec. 27, 1897.)
(No Model.)
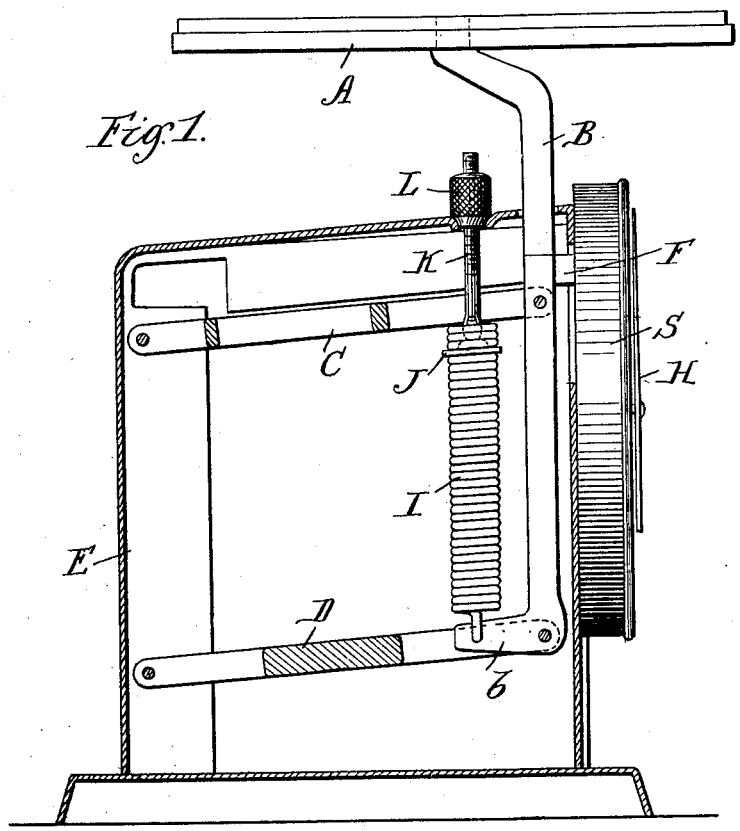
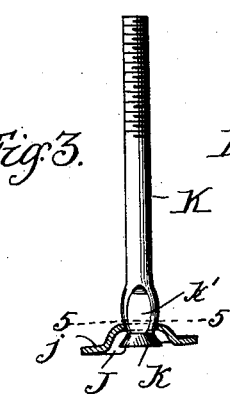
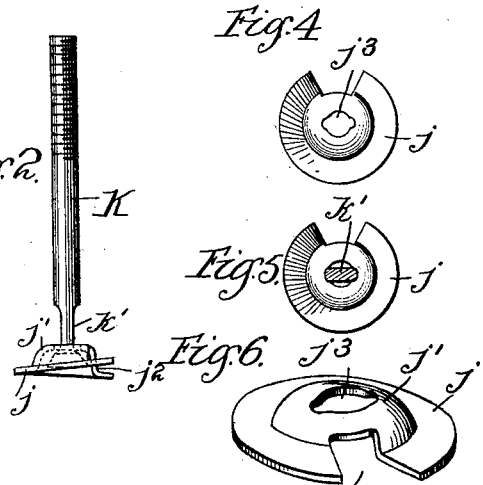
Witnesses
Wm. M. Rheem.
Wm. F. Hamming
Inventor
Marius H. Hansen
by Gridley & Hopkins
Atty's.

UNITED STATES PATENT OFFICE.

MARIUS H. HANSEN, OF CHICAGO, ILLINOIS.

SPRING-SCALE.

SPECIFICATION forming part of Letters Patent No. 612,968, dated October 25, 1898.

Application filed December 27, 1897. Serial No. 663,570. (No model.)

*To all whom it may concern:*

Be it known that I, MARIUS H. HANSEN, a citizen of the United States, residing at Chicago, in the county of Cook and State of Illinois, have invented certain new and useful Improvements in Spring-Scales, of which the following is a specification.

The present invention relates to that class of scales in which the downward movement of the scale-pan under the influence of the load is resisted by the tensile strength of a coiled spring. Usually in scales of this class one end of the spring is connected to one of the scale-levers and the other end is connected to an adjusting device, whereby the operative portion of the spring may be made of the proper length.

The object of the present invention is to provide, for attaching the adjusting device to the spring, means which will insure a proper distribution of the strains, to the end that all lateral strains on the spring will be avoided. To this end I screw into the end of the spring a part which has a spirally-disposed bearing-surface having the same pitch as the convolutions of the spring, and I connect this part with the adjusting-nut through the medium of a stem or equivalent device which is movable laterally with relation to said part and has non-rotative engagement with it.

The invention consists in the features of novelty that are herein fully described with reference to the accompanying drawings, which are made a part of this specification, and in which—

Figure 1 is a sectional elevation of a spring-scale embodying the invention. Fig. 2 is a side elevation of the part which is screwed into the spring and of its laterally-movable stem. Fig. 3 is a section of said part and an elevation of said stem. Fig. 4 is a plan view of said part with the stem omitted. Fig. 5 is a similar view with the stem in section on the line 5 5, Fig. 3. Fig. 6 is a perspective view of said part on a larger scale.

A represents the scale-pan, B the beam by which it is supported, and C and D parallel levers, each fulcrumed at one end to the beam B and at the other end to the scale-frame E. F is an arm proceeding from the beam B into a cylindrical casing G, in which is disposed the mechanism for transmitting movement from the arm F to the pointer H. All of these parts may be of customary or any desired construction.

The beam B is provided at the bottom with a laterally-projecting arm $b$, to which is connected one end of a coiled spring I. The other end of this spring is connected with some part of the scale-frame through the medium of devices which are adjustable for the purpose of regulating the initial tension of the spring. It is in the construction of these devices that the present invention resides.

J represents a part which is screwed into the end of the spring, K a stem connected to said part and movable laterally with relation thereto, and L a nut screwed onto a threaded portion of the stem and bearing upon some suitable part of the scale-frame. Preferably the part J takes the form of a disk of somewhat larger diameter than the spring, so that its periphery may be grasped for the purpose of screwing it into the spring. It has a spirally-disposed bearing-surface $j$, which has a pitch corresponding with the pitch of the convolutions of the spring. Within this bearing-surface it is provided with a shoulder, resulting from an upset portion or protuberance $j'$ of such diameter that it fits snugly within the interior of the spring and prevents the lateral displacement of the part. In order to permit this disk, with its spiral bearing-surface, to be screwed into the spring, the portion thereof upon which the bearing-surface is formed is cut away or notched, as shown at $j^2$. The disk is provided also with a centrally-disposed opening $j^3$, through which the stem K passes, said stem being provided below the disk with an enlarged head $k$. Preferably the opening $j^3$ is of double-keyhole shape and the portion $k'$ of the stem which occupies the opening is of non-circular shape, whereby the disk and stem are prevented from turning relatively to each other. The relative sizes of the opening and that portion of the stem which occupies it are such, however, that the stem is permitted to move laterally in any direction relatively to the disk. This relative movement of the disk and stem permits the spirally-disposed bearing-surface of the disk to accommodate itself to the convolutions of the spring and at the same time permits the stem to assume and maintain a position which is parallel with the line of force.

In addition to embodying this invention in spring-scales of my own manufacture I propose to manufacture and sell either the disk J alone or the disk J and its stem K to other manufacturers to be incorporated in spring-scales.

Having thus described my invention, the following is what I claim as new therein and desire to secure by Letters Patent:

1. In a spring-scale, the combination with the spring, of a plate of uniform thickness having a centrally-disposed protuberance and a spirally-disposed bearing-surface surrounding the protuberance and engaging and conforming to the convolutions of the spring, a stem connected to said plate and movable laterally with relation thereto, and an adjusting-nut turned onto a threaded portion of the stem, substantially as set forth.

2. In a spring-scale, the combination with the spring, of a part having a spirally-disposed bearing-surface engaging and conforming to the convolutions of the spring, a stem having non-rotative engagement with said part, said stem being movable laterally with relation to said part, and an adjusting-nut turned onto a threaded portion of the stem, substantially as set forth.

3. In a spring-scale, the combination with the spring, of a disk having a spirally-disposed bearing-surface fitting between and conforming to adjacent convolutions of the spring, a stem having non-rotative engagement with the disk and movable laterally with relation thereto, and an adjusting-nut turned onto a threaded portion of the stem, substantially as set forth.

4. In a spring-scale, the combination with the spring, of a disk having a spiral bearing-surface fitting between and conforming to adjacent convolutions of the spring, said disk having a non-circular opening, a stem having a non-circular portion occupying said non-circular opening and having an enlarged head engaging the disk, said stem being movable laterally with relation to the disk and a nut turned onto a threaded portion of the stem, substantially as set forth.

5. As a new article of manufacture, the disk J of uniform thickness having the central protuberance $j'$ having an opening $j^3$, said disk having also the spirally-disposed bearing-surface $j$ surrounding the protuberance and cut away at $j^2$, substantially as set forth.

MARIUS H. HANSEN.

Witnesses:
WILLIAM J. HANSON,
L. M. HOPKINS.